March 4, 1930. E. W. SWARTWOUT 1,749,169
COURSE SIGNALING SYSTEM
Filed Aug. 31, 1922 7 Sheets-Sheet 2
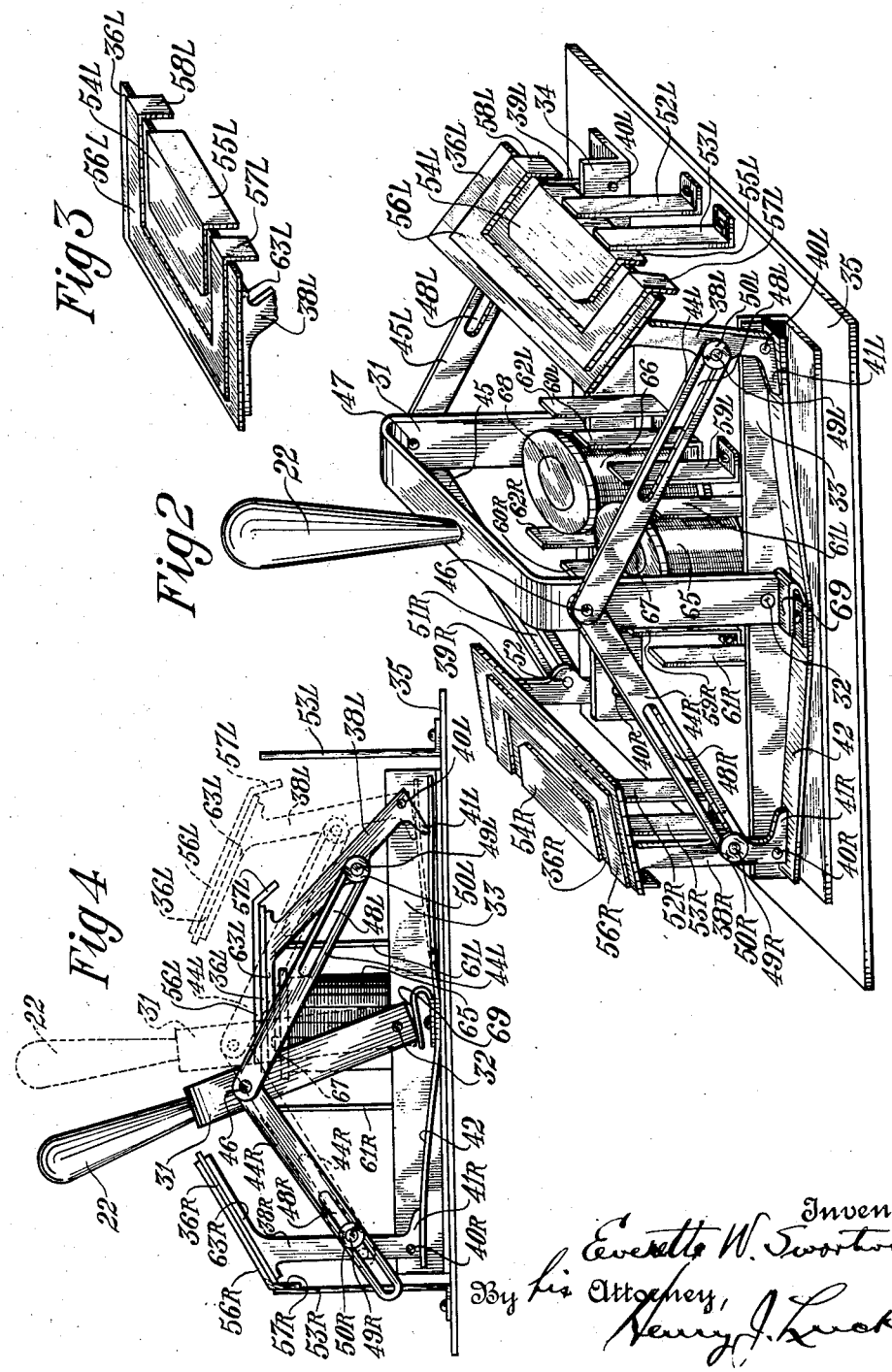

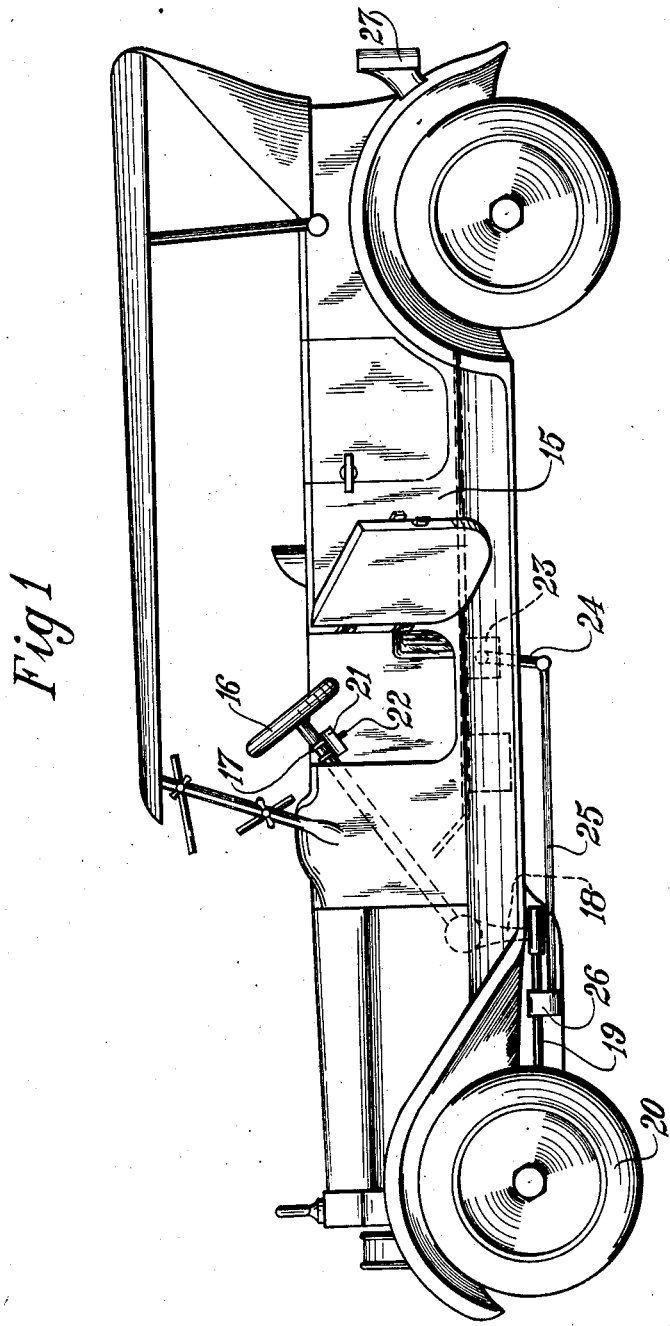

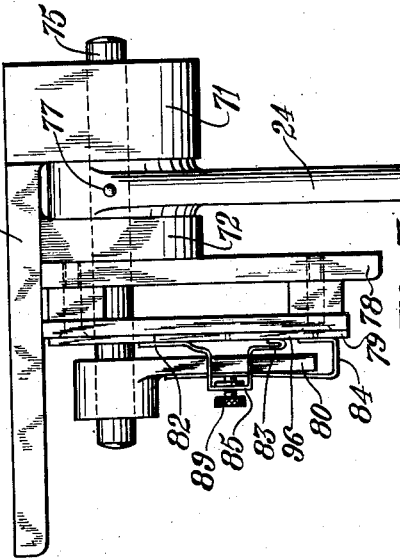
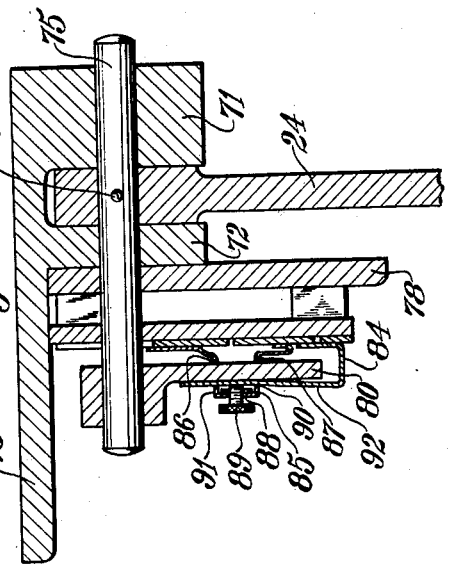
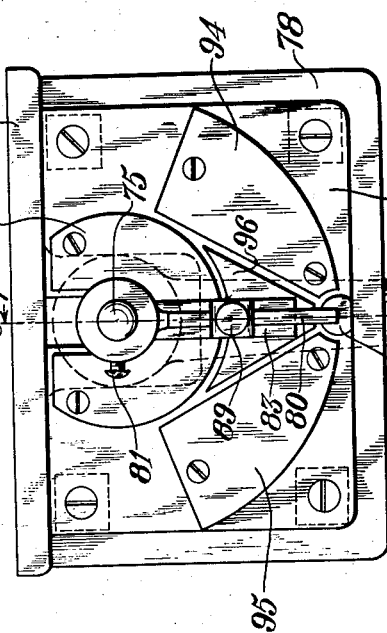
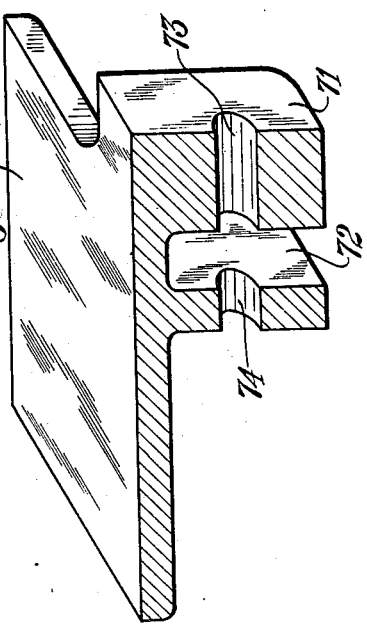

March 4, 1930.  E. W. SWARTWOUT  1,749,169
COURSE SIGNALING SYSTEM
Filed Aug. 31, 1922  7 Sheets-Sheet 4
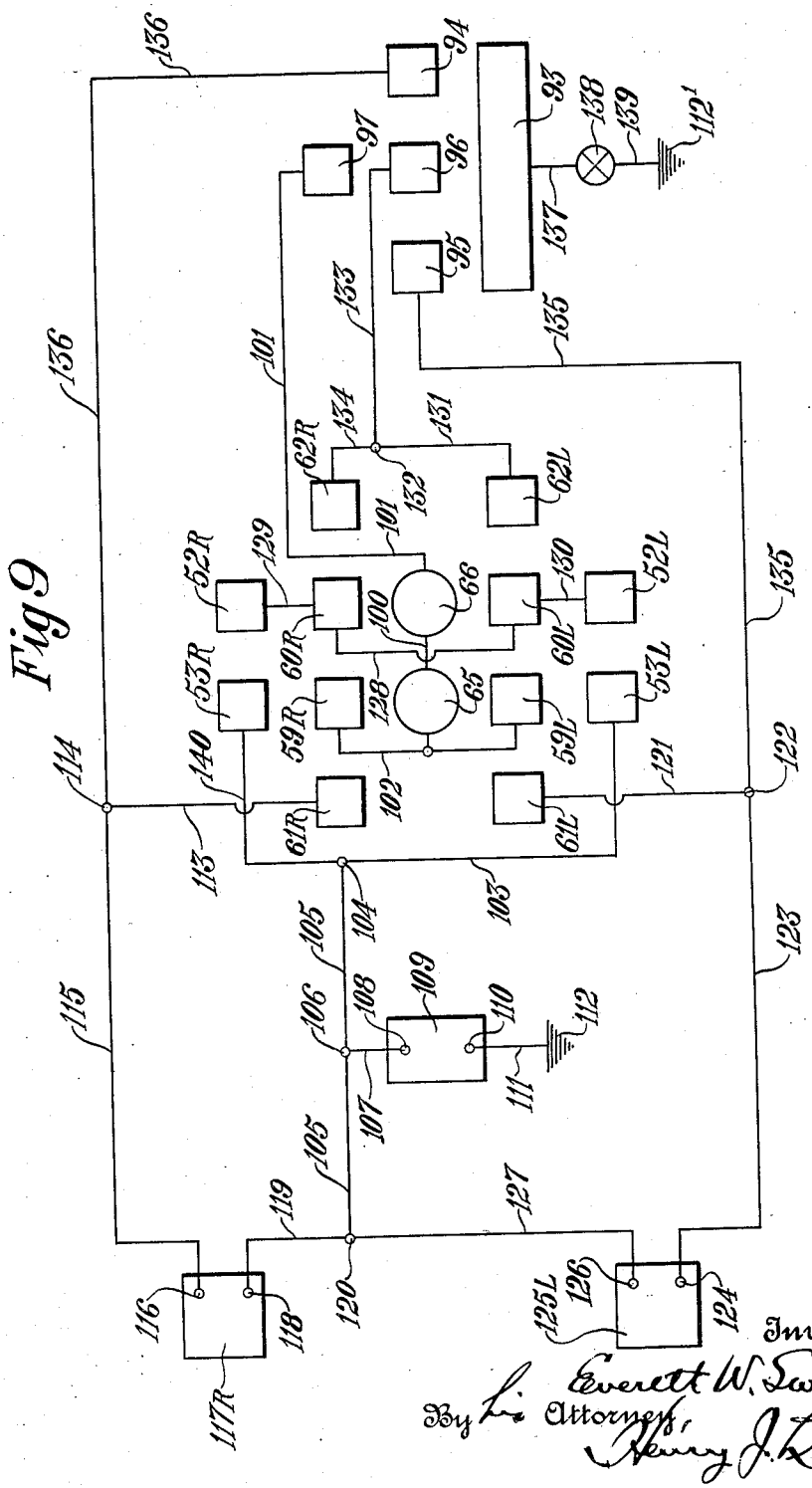

March 4, 1930.  E. W. SWARTWOUT  1,749,169
COURSE SIGNALING SYSTEM
Filed Aug. 31, 1922  7 Sheets-Sheet 5
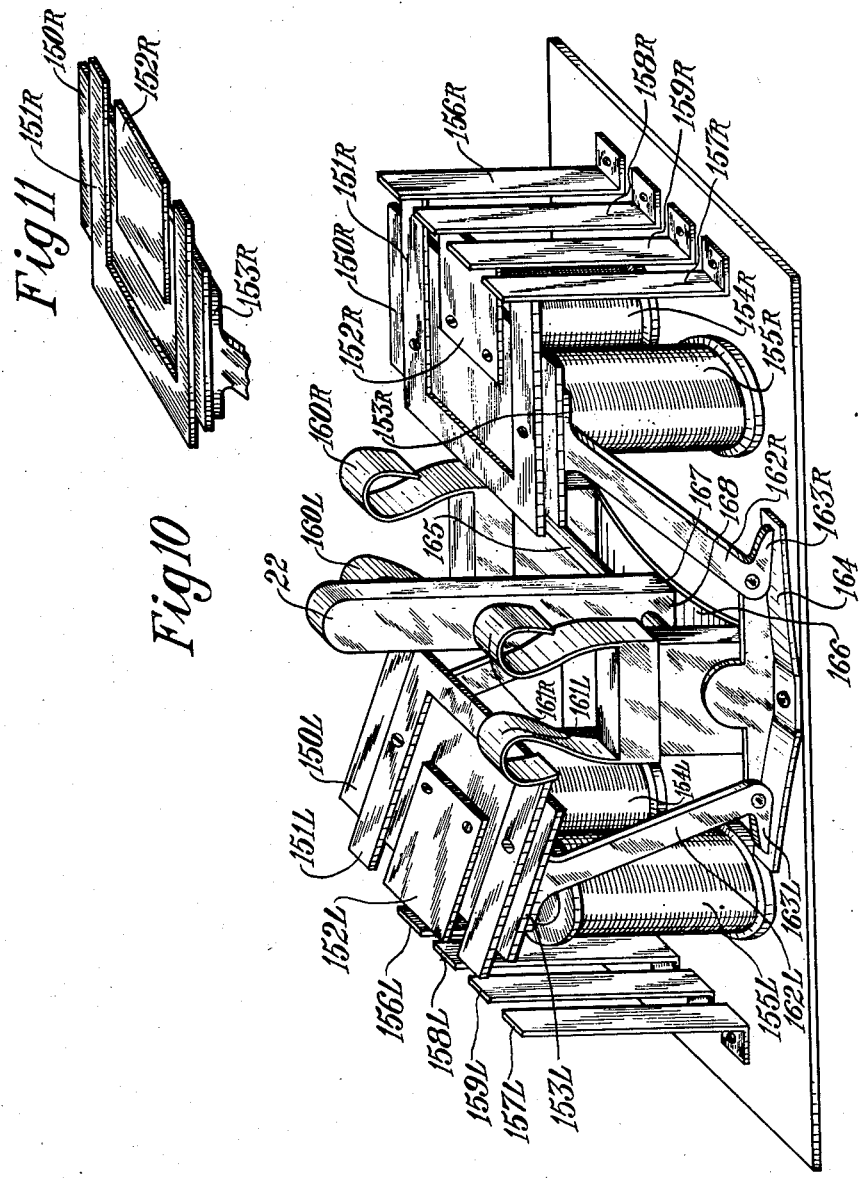

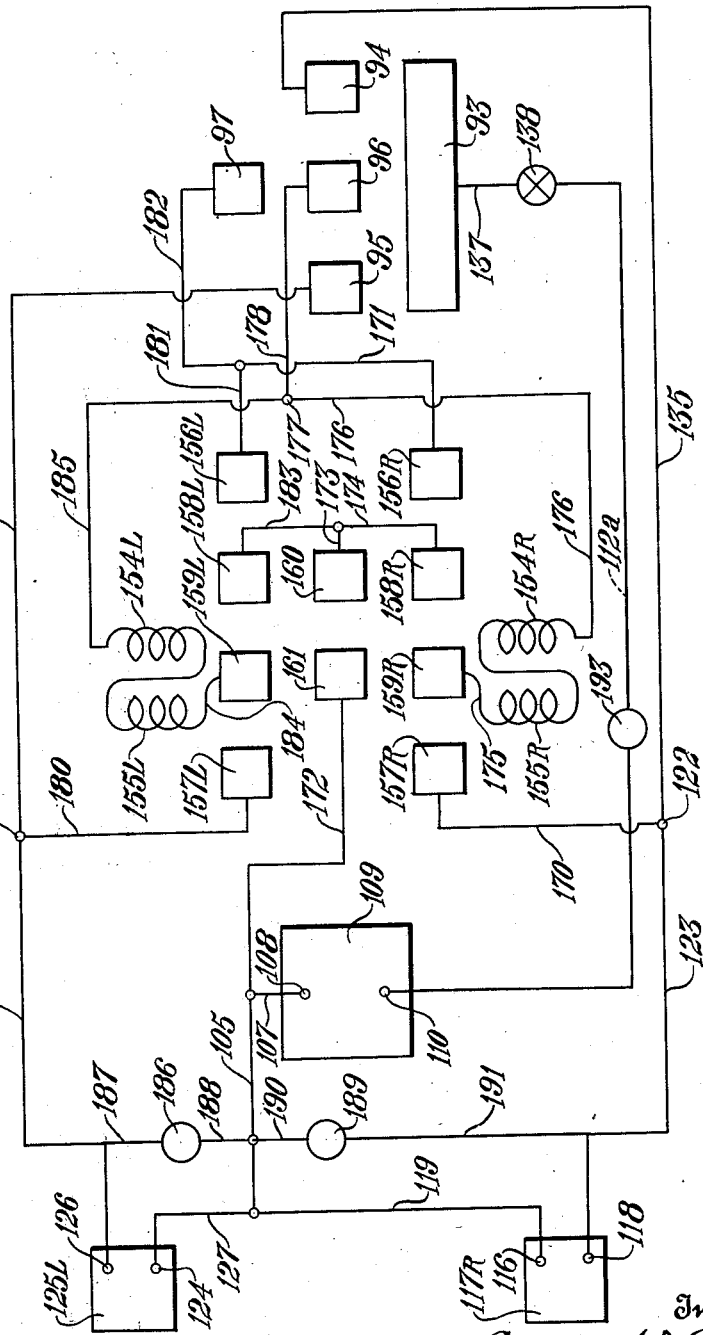

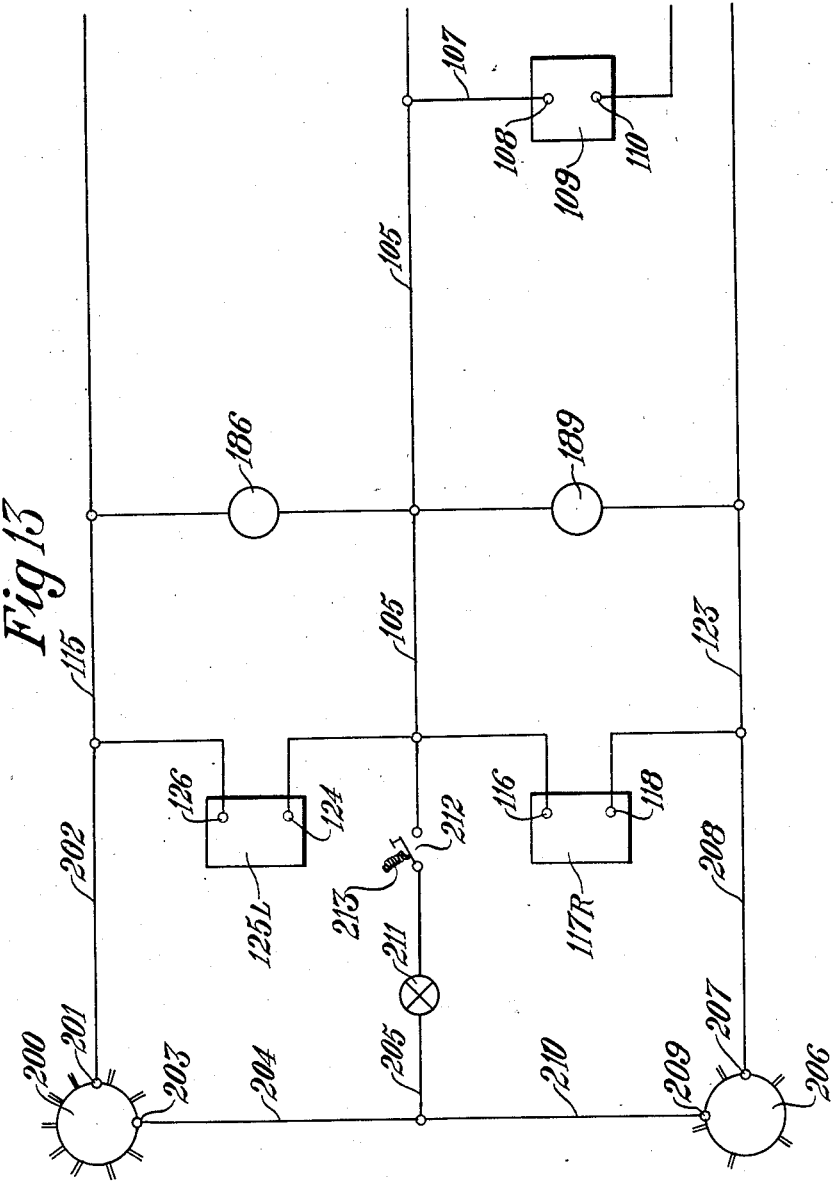

Patented Mar. 4, 1930

1,749,169

UNITED STATES PATENT OFFICE

EVERETT W. SWARTWOUT, OF WHITE PLAINS, NEW YORK

COURSE-SIGNALING SYSTEM

Application filed August 31, 1922. Serial No. 585,355.

This invention relates to course signaling systems.

An object of this invention is to provide suitable electrical means for use on an automobile or other vehicle to afford pre-setting by a manually operated means of a course indication in advance of operation of the steering wheel or other course guiding element and the automatic control of the indication upon actual operation of the steering wheel or other course guiding element or individual actuation of the course indication and for the operation of the course indication by coaction of the manual setting means and the steering gear operated means.

This invention embodies additions to and improvements over the vehicle signal means described and claimed in my United States patent No. 1,365,127, dated January 11, 1921 and entitled Vehicle signaling apparatus, comprising generally means operable manually for pre-setting an indication in advance of the operation of the steering wheel of the vehicle and coacting automatically operated means effective upon actual movement of the steering wheel.

This invention also comprises a modification of the vehicle signal apparatus set forth and claimed in my copending application, Serial No. 436,455, filed by me on January 11th, 1921 and entitled Vehicle signals.

An object of this invention is the provision of improved means for manually effecting the indication of a course indication; improved means for automatically operating or checking the course indication and improved means for rendering the manually setting means ineffectual upon operation of the steering gear operated means.

A further object of this invention is the provision of improved manually setting means whereby upon operation of the same for setting an indication, the manually setting means is restorable to neutral position by manual operation of the same.

A further object of the invention is the provision in the manually setting means of a contact maker and suitable means for holding the contact maker in set position, operative upon manually setting of the same; and the provision of suitable means for releasing the holding means upon operation of the steering gear.

The invention may comprise a manually operable member, usually located on the steering wheel or closely adjacent thereto and including a hand lever, a contact maker controlled by the hand lever, sets of contacts for the respective course directions and coacting with said contact maker, electromagnetic means for holding the contact maker in a set position and suitable means for restoring the hand lever to neutral after setting of the same and for restoring the contact maker to neutral upon operation of the steering gear; further, a steering gear operated member comprising sets of contacts and electrical circuit connections between said sets of contacts of the manually operated member and the sets of contacts of the steering gear operated member combined with suitable course indicators whereby the course indicators may be set by the manually operated member, or the setting of the same may be cancelled or the setting of the same may be changed by directed manual operation of the same; and further whereby in the absence of pre-setting by the manually operated member, the proper indications are automatically effected upon operation of the steering gear; further, whereby upon pre-setting of any indication by means of the manually operable member and the subsequent operation of the steering gear, the indication effected by the manually operable member is continued upon operation of the steering gear in the direction corresponding to the setting of the hand lever or the setting indication is altered corresponding to the direction of operation of the steering gear; further, whereby upon operation of the steering gear subsequent to the pre-setting of the hand lever, the hand lever is restored to neutral and the manually operated member is de-energized as a whole or otherwise rendered ineffectual until the steering gear is returned to its neutral position.

Further features and objects of the invention will be more fully understood from the following detailed description and the accompanying drawings, in which Fig. 1 is a side elevation of an automobile showing diagrammatically a preferred form of the invention embodying a manually operable member located on the steering column, a steering gear operated member actuated by the steering mechanism of the automobile and a unitary indicator located at the rear of the automobile and controlled by the manually operated member and the steering gear operated member;

Fig. 2 is a top perspective view of a preferred form of the manually operated member with casing removed showing its parts in neutral position;

Fig. 3 is a detail perspective view of a contact maker of the manually operated member shown in Fig. 2;

Fig. 4 is a detail perspective view of a portion of the manually operated member, shown in Fig. 2, with the hand lever and the "right" contact maker shown in full outline in set position and in dotted outline in an intermediate position;

Fig. 5 is a front elevation of the steering gear operated member, with the casing removed;

Fig. 6 is a right edge view of Fig. 5;

Fig. 7 is a sectional elevation on line 7—7 of Fig. 5;

Fig. 8 is a detail perspective view, partially in section centrally of the bearing axis, of the supporting and bearing plate shown in Figs. 5, 6 and 7;

Fig. 9 is a diagram of the circuit connections of the electrical parts of the manually operated member shown in Fig. 2 and the steering gear operated member shown in Figs. 5 to 8, inclusive;

Fig. 10 is a top perspective view of a modified form of manually operated member, with the casing removed;

Fig. 11 is a detail perspective view of a contact maker of the manually operated member shown in Fig. 10;

Fig. 12 is a diagram of the electrical circuits and the electrical parts of the manually operated member shown in Fig. 10 and of the electrical parts shown in the steering gear operated member shown in Figs. 5 to 8, inclusive; and Fig. 13 is a diagram of the electrical circuits for operating audible signals operable with the right turn and left turn indicators and applicable to the circuits shown in Figs. 9 and 12, respectively.

Referring to Fig. 1 of the drawings, an automobile 15 is provided with the usual steering wheel 16 mounted in the steering column 17 and suitably operatively connected with the lever 18 pivotally connected to a drag link 19, knuckle levers and usual connecting link for turning the front wheel 20, as will be understood, for effecting a right or left turn of the automobile.

The course indicating system may consist of a manually operated member 21, usually mounted on the steering column 17, and provided with the hand lever 22 for setting a "right" or a "left" indication intended to be pursued by the operator, which may be set in advance of the turning operation of the steering wheel 16.

The course indicating system further comprises the steering gear operated member 23 which may be suitably mounted on the underside of the body of the automobile 15, as indicated in Fig. 1, or at any other suitable location as desired; the operating arm 24 of the steering gear operated member 23 may normally depend substantially vertically when the steering wheel 16 is in neutral position. The arm 24 is suitably connected with the steering gear as by means of the connecting link 25 secured at one end by the clamp 26 to the drag link 19 of the steering gear whereby upon turning the steering wheel 16 to the "left," the drag link 19, connecting link 25 and the arm 24 are shifted forwardly relatively to the body of the automobile, or, as viewed in Fig. 1, toward the left; and, conversely upon rotating the steering wheel 16 to the "right," the drag link 19, connecting link 25 and the arm 24 are shifted rearwardly of the automobile body, or, as viewed in Fig. 1, toward the right.

Such manually operated member 21 and such steering gear operated member 23 are suitably connected with the indicator 27, located at the rear of the automobile body as is indicated in Fig. 1, or elsewhere on the automobile as is desired, whereby a colored light or a semaphore or other indication of a "right" or a "left" turn as the case may be, is actuated upon manual setting of the hand lever 22, or upon operation of the steering wheel 16, or upon mutual operation of the same as is more fully set forth hereinafter.

One form of the manual operable member is shown in Figs. 2, 3 and 4, the same including the hand lever 22. The enclosing casing of any appropriate form, is omitted from the drawings. The hand lever 22 is mounted on the yoke 31 pivoted at its opposite lower ends to the pins 32, respectively located in the upwardly extending flanges of the flanged plates 33, 34. The plates 33, 34 are secured to the insulating base plate 35 in any suitable manner.

At opposite sides of the pivoted yoke 31 are disposed the contact makers or bridge members 36L, 36R, comprising circuit closures for a "lift" or a "right" indication. The bridge member 36L is mounted on the oppositely disposed supporting legs 38L, 39L, respectively pivoted adjacent their lower ends on the pins 40 extending outwardly from the flange plates 33, 34. The leg 38L is provided with the toe 41L coacting with the flat spring 42, serving to bias the contact bridge member 36L in its neutral position as shown in Fig. 2.

Similarly, the leg 39R is provided with a toe (not shown) similar to the toe 41, and coacting with a spring similar to the spring 42, disposed on the flanged plate 34.

The bridge member 36L is connected to the yoke 31 by means of the oppositely disposed slotted links 44L, 45L stationarily pivoted at one end on the pins 46, 47, respectively; the slots 48L of the slotted links 44L, 45L respectively receive the pins 49L secured to the legs 38L, 39L; the links 44L, 45L are held in sliding relation with the legs 38L, 39L by means of the washers 50 carried at the outer ends of the pins 49L. The slots 48L of the links 44L are closed at their outer ends.

The bridge member 36R is mounted and connected with the yoke 31 in a manner similar to the bridge member 36L and like parts are designated by the same reference numbers but with an "R" suffix.

Coacting with the bridge member 36L is provided the set of outwardly disposed contacts 52L, 53L, secured at their lower ends by screws or otherwise to the base plate 35 and extending freely upwardly as viewed in Fig. 2. The bridge member 36L is formed of a plate of suitable insulating material on which are maintained an inner bridge contact 54L having a flange portion 55L and an outer bridge contact 56L having a flange portion 57L, whereby the inner bridge contact 54L and the outer bridge contact 56L, are electrically insulated from one another.

The inner sets of contacts designated 59L, 60L, 61L and 62L are suitably mounted on the insulating base 35.

The bridge member 36R is similarly provided with an inner bridge contact 54R and an outer bridge contact 56L and similarly arranged in co-operation with inner and outer sets of contacts, and like parts are designated by the same reference numbers but with an "R" suffix.

Upon shifting the hand lever 22 manually to the left, as viewed in Fig. 2 and indicated in Fig. 4, the yoke 31 is oscillated to the left and the bridge member 36L is oscillated to the left thereby bringing the bridge contact 54L in electrically bridging relation with the two inner contacts 59L, 60L and bringing the contact 56L in electrical bridging relation with the contacts 61L, 62L.

In such shifting of the hand lever 22 to the left and consequent rotation of the bridge member 36L, the bridge member 36R is undisturbed in its neutral position as shown in Fig. 2, by reason of the slots 48R, of the links 44R, 45R sliding idly past the pins 49R, 52R of the legs 38R, 39R of the bridge member 36R, as is indicated in Fig. 4.

On the lower face of the bridge member 36L is the plate 63L of magnetic material serving as an armature for the electromagnet or pair of electromagnets 65, 66, when the bridge member 36L has been moved to its inner position. Preferably, as indicated in Figs. 2 and 3, the legs 38L, 39L are integral with the armature plate 63L, formed by a stamping of iron or soft steel. The terminals of the windings of the coils 65, 66 are connected in the indicator circuit, as is set forth hereinafter, upon the manual operation of the hand lever 22.

The bridge member 36R is similarly provided with a plate of magnetic material 63R corresponding to the aforesaid plate 63L.

If desired, an auxiliary spring 69 at each lower, squared end of the yoke 31 may be employed to directly bias the yoke 31 and therewith the hand lever 22 to neutral.

A preferred form of the steering-gear-operated member is shown in Figs. 5, 6, 7 and 8, and comprises a plate 70 having the spaced bearing flanges 71, 72, provided with the registering openings 73, 74 for receiving the shaft 75. The operating arm 24 corresponds to the operating arm 24 of the general arrangement shown in Fig. 1. The operating arm 24 is fixed to the shaft 75 by means of the pin 77.

Secured to the flange 72, see Figs. 6 and 7, is disposed the plate 78 on which is mounted the board 79 of insulation fiber or the like.

To the forward end of the shaft 75 is secured the rotating contact arm 80 which may be set relative to the shaft 75 by means of the set screw 81.

On the contact arm 80 is carried the upwardly disposed wiping contact 82 and the intermediately disposed wiping contact 83 and the lowermost disposed wiping contact 84. For simplicity of manufacture and assembly, the wiping contacts 82, 83 may be formed with a single strip of conducting material such as a bent plate of resilient metal; the central portion 85 thereof is recessed at the opposite locations 86, 87 to receive therethrough the arm 80 and is further recessed at 88 and threaded to receive the threaded stem of the set-screw 89. The central portion 85 is further slotted at the opposite locations 90, 91 to receive therethrough the outer portion 92 of the wiping contact 84 to afford simultaneous clamping by means of the set-screw 89 and electrical connection between the wiping contacts 82, 83, 84. The arrangement also affords adjustment between the wiping contacts for different extents of throw of the operating arm 24 for varying shifting of the steering gear in the different types of automobiles.

The arm 80 may be made of metal and in such instance the shaft 75 may be made of wood or other hard electrical non-conducting material; or the arm 80 may be insulating material and the plate 70 of cast metal, in which case the shaft 75 may be of metal.

On the exposed face of the insulating board 79 is located the upper contact plate 93 secured by screws or the like to the board 79. The contact plate 93 may be of annular formation excepting for its upper portion and provides sliding electrical engagement with the wiping contact 82.

Radially outwardly, see Fig. 5, of the contact plate 93 are disposed the right-hand contact plate 94, the left-hand contact plate 95, the intermediate upper contact plate 96, and below the last named is disposed the lower intermediate contact plate 97, all of which are suitably mounted on the insulation board 79.

In Fig. 5, the positions of the arms 24, 80 are in neutral, i. e., when the steering wheel is neutral, at which position the wiping contact 83 is in electrical engagement with the contact plate 96, the wiping contact 84 in electrical engagement with the contact plate 97, and the wiping contact 82 is in electrical connection with its contact plate 93.

Upon rotating the operating arm 24 to the left, as ensues upon turning the steering wheel 16 to the "left" thereby moving the connecting link 25 forwardly of the automobile body, the arm 80 is rotated to the "left", as viewed in Fig. 5, and the wiping contact 84 is moved out of engagement with the contact plate 97 and brought into engagement with the contact plate 95, whereas the contact 83 is maintained in engagement with the contact plate 96 and the wiping contact 82 continues in engagement with the contact plate 93. In such "left" positions of the respective wiping contacts 82, 83, 84, the contact plates 93, 95, 96 are in electrical connection and the circuit through the indicator is closed for indicating a turn to the "left", as will more fully appear hereinafter.

Upon turning the steering wheel to the "right", the operating arm 24 of the steering-gear-operated member is rotated from neutral to the right, as viewed in Fig. 5, and electrical connection between the contact plates 93, 96, 97 effected through the wiping contacts 82, 83, 84 respectively and the circuit through the indicator is closed to indicate a turn to the "right".

Referring to the diagram of the electrical circuit shown in Fig. 9, the windings of the magnets 65, 66 are shown connected in series with one another by the lead 100; the remaining terminal of the magnet 66 is connected by the lead 101 to the contact plate 97 of the steering-gear-operated member and the remaining terminal of the winding of the electromagnet 65 is connected to the lead 102 running on the one side to the contact 59L and on the other side to the contact 59R, both contacts 59L, 59R, being parts of the manually operated member, see Fig. 2.

The contacts 53L and 53R, Fig. 9, are connected to one another by the lead 103 which in turn is connected at 104 to the conductor 105, which at 106 is connected by the lead 107 to one terminal 108 of the battery 109; the other terminal 110 of the battery 109 may be connected by the lead 111 to "ground" 112. The battery 109 may be the battery which is regularly equipped on the automobile or may be a separate battery, storage or otherwise, a magnetic or other suitable source of electrical energy.

The terminal 61R (see Fig. 2), is connected by the lead 113, see Fig. 9, at 114 to the line conductor 115 and thereby with one terminal 116 of the "right" turn indicator 117; the remaining terminal 118 of the "right" turn indicator 117 is connected by the lead 119 at 120 to the conductor 105. Similarly the contact 61L (see Fig. 2), is connected by the lead 121 at 122 to the line conductor 123 and to one terminal 124 of the "left" turn indicator 125; the opposite terminal 126 of the "left" turn indicator 125 is connected by the lead 127 at 120 to the conductor 105.

The contacts 60L, 60R (see Fig. 2), are connected to one another by the lead 128, see Fig. 9; the contact 60R is connected by the lead 129 to the contact 52R and the contact 60L is connected by the lead 130 to the contact 52L. The contact 62L (see Fig. 2), is connected by the lead 131, see Fig. 9 at 132 to the conductor 133 extending to the contact plate 96, see Fig. 5; the contact 62R is connected by the lead 134, see Fig. 9, at 132 to the conductor 133 connected to the contact plate 96, see Fig. 4.

The contact plate 95, see Fig. 5, is connected by the conductor 135, see Fig. 9, at 122 to the line conductor 123 running to the "left" turn indicator 125. The contact plate 94, see Fig. 5, is connected by the conductor 136, see Fig. 9, at 114 to the line conductor 115 of the "right" turn indicator 117.

The contact plate 93 is connected by the conductor 137, see Fig. 9, through the switch 138 and thence connected by the conductor 139 to "ground" 112¹.

The switch 138 may be omitted if desired, but is preferably included in the circuit and is useful for disconnecting the circuit as when the automobile is being parked with the front or guide wheels turned at an angle, i. e., to the "right" or to the "left," or in other circumstance.

The "left" turn indicator 125 and the "right" turn indicator 117 have been separately referred to in reference to the diagram shown in Fig. 9, but such indicators may be parts, i. e., lamps, semaphores, operating either individually or jointly, of a unitary indicating device, such as 27 in Fig. 1, and one or more such indicating devices may be employed and connected in the circuit, as will be understood.

Considering the manually operated member illustrated in Figs. 2, 3 and 4, upon the operator setting the hand lever 22 say to the "left," as viewed in Fig. 2, the bridge member 36L, by action of the yoke 31, slotted links 44L, 45L, and the legs 38L, 39L are moved from their outer or neutral position shown in Fig. 2, to its inner position over the cores 67, 68 of the electromagnets 65, 66 as indicated in Fig. 4, whereby its armature plate 63L is brought into magnetic relation with the cores 67, 68. Such rotation of the bridge member 36L is counter to the action of the springs 42, 42 against the toes 41L, 41L, of the respective legs 38L, 39L of the bridge member 36L at the limit of such rotation of the bridge member 36L the feet 41L, 41L the springs 42, 42 are held in maximum depressed positions by the magnetic pull of the magnetic attraction of the electromagnets 65, 66 on the armature 63L, at the inner position, the bridge contact 54L interconnects the contacts 59L, 60L and the bridge contact 56L interconnects the contacts 61L, 62L. During such rotation of the bridge member 36L to the "left" the bridge member 36R remains in its neutral position shown in Fig. 2, whereat its bridge member 54R interconnects the contacts 53R, 52R.

Referring now to the diagram in Fig. 9 and assuming a "left" setting of the hand lever 22, and the steering wheel in neutral the following circuit is closed: from "ground" 112 through the lead 111 connected to the terminal 110 of the battery 109, lead 105, lead 127, "left" turn indicator 125, line conductor 123, lead 121, terminal 61L (bridge contact 57) terminal 62L, lead 131, lead 133, contact plate 96 (wiping contacts 83, 82), contact plate 93, thence through the "ground" leads 137, 138 to "ground" $112^1$. Simultaneous with the closing of the aforesaid circuit, the circuit is closed through the contact plate 97 connected by the wiping contacts 84, 83 with the contact plate 93, thence through the lead 101, electromagnets 66, 65, in series, thence through terminal 59L, (bridge contact 54L) to terminal 60L, thence through conductor 128, terminal 60R, lead 129, terminal 52R, (bridge contact 54R), to terminal 53R, lead 140, thence to conductor 105, extending through the battery 109 to "ground" 112.

By the aforesaid first-traced circuit, the "left" turn indicator 125 is actuated and by the aforesaid second-traced circuit the electromagnets 65, 66 are energized to hold the bridge member 36L in its "left" or set position.

Assuming the steering wheel 16, see Fig. 1, to be now turned to the "left", for a left-hand turn of the front or steering wheel 20, the connecting link 25 is moved forwardly to shift the arm 24 forwardly of the car, i. e., to the left as shown in Fig. 5, whereupon the interconnection of the contact plate 96 with the contact plate 97 is broken and the contact plate 95 is connected with the contact plate 96 through the interconnecting wiping contacts 84, 83, while the connection between the contact plate 96 and the contact plate 93 is maintained through the interconnection of the wiping contacts 83, 82. Upon such "left" turning of the steering wheel, a new circuit is closed through the contact plate 96, see Fig. 9, and contact plate 93 to "ground" $112^1$ thence through "ground" 112, battery 109, lead 105, lead 127, "left" turn indicator 125, line conductors 123, 135 to the contact plate 95, now connected, as aforesaid, to the contact plates 96, 93. The breaking of the connection between the contact plate 93 and the contact plate 97, de-energizes the circuit through the electromagnets 66, and effects the release of the bridge member 36L to neutral and the restoring of the hand lever 22 to its neutral position, by action of the springs 42, 42 and the slotted links 44L, 45L. Upon completing the turn of the automobile, the steering wheel 16 will have been reversely turned to neutral, whereupon the wiping contacts 82, 83, 84, return to mutual interconnection of the contact plates 93, 96, 97, see Fig. 5.

Similarly, for a "right" setting of the hand lever 22 and subsequent turning of the steering wheel 16 to the "right", firstly, the actuation of the "right" turn indicator 117 takes place concomitant with the excitation of the electromagnets 66, 65, and secondly, the "right" turn indicator 117 is maintained in actuated position and the electromagnets 66, 65 are de-energized.

Upon shifting the hand lever 22 to the right, in advance of turning the steering wheel 16, the afore named first circuit is: "ground" 112, lead 111, battery 109, conductor 105, lead 119, "right" turn indicator 117, line conductor 115, lead 113, terminal 61R (bridge contact 56R), terminal 62R, lead 134, lead 133, contact plate 96, contact plate 93, leads 137, 139, to ground $112^1$, thereby actuating the "right" turn indicator 117. The circuit connected through the electromagnets 65, 66, in parallel to the circuit just traced, is through contact plate 96, (wiping contacts 83, 82), contact plate 97, conductor 101, electromagnets 66, 65, lead 102 terminal 59R (bridge contact 54R), terminal 60R, lead 128, terminal 60L, lead 130, terminal 52L, (bridge contact 54L) terminal 53L, thence through conductor 103 to conductor 105.

While the hand lever 22 is turned to its "right" position, upon turning the steering wheel 16 to the "right", therewith moving the connecting link 25 rearwardly of the body of the car, i. e., to the right in Fig. 1, the arm 24 is shifted to the "right", see Fig. 5, whereupon the connection between the contact plate 96 and contact plate 97 is interrupted thereby de-energizing the electromagnets 65, 66, similarly as in the converse position as set forth hereinabove, while a new circuit is effected through the contact plates 94, 96 by means of wiping contacts 84, 83, thence through wiping contact 82, contact plate 93, leads 137, 139 to "ground" 112¹, "ground" 112, battery 109, lead 119, "right" turn indicator 117 and the line conductors 115, 136 leading to the contact plate 94, thereby maintaining the "right" turn indicator 117 in actuated condition.

Assuming the hand lever arm 22 has not been operated in advance of the turning of the steering wheel 16, upon turning the steering 16, say to the "left", the contact plate 93 is connected with the contact plate 96 and therewith with the contact plate 95, whereupon the "left" turn indicator 125 is connected in circuit with the battery 109, namely, "ground" 112, lead 111, battery 109, conductor 105, lead 127, "left" turn indicator 125, line conductor 123, lead 135, contact plate 95, contact plate 93, and to "ground" 112¹. Upon returning the steering wheel to neutral, the connection between the contact plates 93 and 95 is broken, thereby interrupting the circuit through the "left" turn indicator 125 and the battery 109, thereby restoring the "left" turn indicator 125 to neutral.

Assuming the hand lever 22 not to have been operated and the steering wheel 16 turned to the "right", the contact plate 94 is interconnected with the contact plate 93, thereby closing the circuit through the "right" turn indicator 117 and the battery 109, i. e., "ground" 112, battery 109, conductor 105, lead 119, "right" turn indicator 117, line conductors 115, 136, contact plate 94, contact plate 93 and thence to "ground" 112¹.

Occasionally, under traffic conditions, it becomes necessary to involuntarily alter the course intended to be transversed by the operator; in such circumstance assuming the operator to have intended to turn to the "right" and to have accordingly set the hand lever 22 to the "right," thereby actuating the "right" turn indicator 117, as above described, i. e., through battery 109, "right" turn indicator 117, line conductor 115, terminal 61R, terminal 62R, contact plate 96, contact plate 93, thence through "ground" 112, in return to the battery 109, and lead 128, lead 130, terminals 52L, 53L, lead 103, line conductor 105, battery 109; upon the operator being unable to turn the automobile to the "right" when approaching the turn and in lieu thereof turns the steering wheel to the left, the connection between the contact plates 96 and 93 is interrupted thereby de-energizing the "right" turn indicator 117 and electrical connection is established between the contact plates 93 and 95 whereupon the circuit through the "left" turn indicator 125 is effected, i. e., "ground" 112, battery 109, conductor 105, lead 127, "right" turn indicator 125, line conductors 123, 135, contact plate 95, contact plate 93, "ground" leads 137, 139 to "ground" 112¹.

The corresponding operation takes place upon setting the hand lever to the "left" and upon subsequently turning the steering wheel to the right, and circuit disconnection and connection corresponding to those set forth specifically hereinabove, are effected whereby the "left" turn indicator 125 is first actuated and then subsequently restored to neutral and the "right" turn indicator actuated.

In Fig. 10, I have indicated another form of manual setting member, the same comprising the hand lever 22 for operating the respective bridge members 150R, 150L. As is shown in Figs. 10 and 11, the bridge member 150R comprises a plate of insulation on which are mounted the outer bridge contact 151R and the inner bridge contact 152R, similar to the bridge members 36R, 36L shown in Figs. 2, 3 and 4. Below the insulation of bridge member 150R is located a plate of iron or other magnetic material 153R coacting as an armature for a pair of electromagnets 154R, 155R. The bridge contact 152R interconnects the spring terminals 158R, 159R when in set position, as is indicated in Fig. 10, and the bridge contact 151R interconnects the spring terminals 156R, 157R in such set position. When the bridge member 150R is in its neutral position, corresponding to the position of the "left" bridge member 150L shown in Fig. 10, the bridge contact 151R interconnects the inwardly disposed pair of contacts 160R, 161R.

The bridge member 150R is mounted on the oppositely disposed legs 162R having the feet 163R coacting with the biasing spring 164.

The "left" bridge member 150L is similarly formed of the outer bridge contact 151L and inner contact 152L, the same co-operating with the outwardly disposed pair of spring contacts 156L and 157L, and the outwardly disposed pair of spring contacts 158L and 159L.

The inwardly disposed terminals for the "left" bridge member 150L are designated 160L and 161L and are respectively unitary with the inwardly disposed contacts 160R and 161R coacting with the "right" bridge member 150R. The contacts 160L and 160R are preferably of the spring blade type and extend on opposite sides of an electrically interconnecting block, as indicated in Fig. 10. The contacts 161L and 161R are similarly arranged and constructed.

The bridge member 150L is similarly provided with a plate 153L of magnetic material serving as an armature for the pair of contacts 154L, 155L and the bridge member 150L is mounted on the oppositely disposed legs 162L having the toes 163L coacting with the biasing spring 164.

The armature 153R may be integral with the legs 162R, as of a single stamping, and similarly the armature 153L may be unitary with its legs 162L.

The hand lever 22 is mounted loosely on the stud 165 and is provided with the biasing spring 166 coacting with the squared lower end 167 of the lever 22 for restoring the same to neutral upon release manually after setting either to the "right" or "left." As one such form of automatic return for the manual member 22, I show the spring 166 as a flat spring bowed upwardly centrally and extending between the parts of the contacts 160L, 160R and 161L, 161R.

The circuit connections of the manual setting member shown in Fig. 10, are diagrammed in Fig. 12, wherein the "right" turn indicator is designated 117, the "left" turn indicator 125, the contact plates 93, 94, 95, 96, 97 of the steering-gear-operated member, the battery 109 and certain interconnecting wires are the same as those indicated in the diagram Fig. 9 by the same reference numbers.

Referring to Fig. 12, and assuming the hand lever 22, Fig. 10, to be turned to the "right", the bridge plate, 150R will have been moved from its inward position to its outward position—shown in full outline in Fig. 10—whereupon its bridge contact 151R interconnects the spring contact 156R with the spring contact 157R and its bridge contact 152R interconnects the spring contact 158R with spring contact 159R. Tracing the circuit from the battery 109, the circuit is completed through the lead 119, "right" turn indicator 117, line conductor 123, lead 170, flexible contact 157R (bridge contact 151R), flexible contact 156R, lead 171, conductor 182, contact plate 97, contact plate 96, contact plate 93, return leads 137—112ª to battery 109.

As indicated in Fig. 12, in lieu of employing "grounds" as at 112 in Fig. 9, the circuit may be completed by the conductor 112ª.

Simultaneous with the closing of the circuit through the "right" turn indicator 117, the circuit is completed from the battery 109 through lead 172, flexible contact 161, (bridge contact 151L), flexible contact 160, lead 173, lead 174, flexible contact 158R, (bridge contact 152R) flexible contact 159R, lead 175, electromagnets 155R, 154R, (in series), conductor 176 connected at 177 to the lead 178 running to contact plate 96, which is interconnected with the contact plate 93, from which the current returns to the battery 109, as aforesaid. The bridge member 150R is according electromagnetically held in its operated position.

Upon turning the steering wheel 16 to the right, the connection between the contact plates 96 and 93 is broken, thereby de-energizing the circuit, just described, through the electromagnets 155R and 154R, and thereby effecting the return of the bridge plate 150R from its outward to its inward position by action of toes 163R the returning spring 164, whereupon the bridge contact 151R returns in electrical connection with the inward flexible terminals 160, 161.

Upon returning the steering wheel 16 to neutral position, the interconnection of the plates 97, 96, 93 is restored and the circuit is broken the "right" hand indicator 117.

Similarly, upon initial indication manually to the "left" by the hand lever 22, of the manually operated member shown in Fig. 10, the bridge member 150L is moved to the left as viewed in Fig. 10, and connection effected by the bridge contact 151L between the flexible contacts 156L and 157L and by the bridge contact 152L between the flexible contacts 158L and 159L, thereby, as will appear, closing the circuit through the electromagnets 155L, 154L similarly as hereinabove and whereby the armature 153L of the bridge member 150L is held in engagement with the cores of the electromagnets 155L, 154L, to maintain connection of the aforesaid flexible contacts.

The circuit through the "left" turn indicator 125, is via battery 109, line conductor 105, lead 127, "left" turn indicator 125, line conductor 115, lead 180, flexible contact 157L (contact bridge 151L) contact 156L, lead 181, lead 182, contact plate 97, contact plate 93, and thence through the return conductor 112ª to the battery 109.

Upon turning the steering wheel 16 to the "left" the connection between the contact plate 96 and the contact plate 93 is broken and the connection between the contact plate 93 and the contact plate 95 established whereby the "left" turn indicator 125 is maintained in actuation by the newly established circuit through the battery 109, "left" turn indicator 125, line conductors 115, 136 to the contact plate 95, similarly as aforesaid, and simultaneously with the closure of such circuit, the circuit through the electro-magnets 155L and 154L is de-energized permitting the bridge member 150L to return to its neutral or inner position.

In the circumstance of turning the steering wheel without operating the manual lever 22 in advance thereof, the proper indicator is actuated by the steering wheel in lieu of the manual operating member and the circuits are completed through the "left" turn indicator 125 from the "right" turn indicator 117 as the case may be, similarly as traced hereinabove in connection with the diagram of Fig. 9.

The switch 138 shown in the circuit of Fig. 12, is a cut-out switch when it is desired to disconnect the signaling system from the manual or the steering-gear-operated member, or both, as when the automobile is being parked, laid up for storage or for other purposes as may be desired.

Pilot means may be employed for indicating the operative condition of the circuit and in Fig. 12, I have indicated the pilot lamp 186 connected in multiple with the "left" turn indicator 125 by the lead 187 connected with the line conductor 115 and the lead 188 connected with the wire 105; similarly the pilot lamp 189 is connected in multiple with the "right" turn indicator by the lead 190 running to the wire 105 and by the lead 191 running to the line conductor 123.

It will be noted that pilot lamps such as 186, 189 may be employed in the circuit diagrammed in Fig. 9 and by similar connections, if desired.

The pilot lamps 186, 189 may be arranged within a single casing, to reduce the pilot means to a single device. If single pilot lamp is desired, the same may be connected in at 193 in the return lead 112ª.

In the diagram shown in Fig. 13, the "left" turn indicator is indicated at 125, the "right" turn indicator at 117, the "left" pilot lamp at 186 and the "right" pilot lamp at 189, the battery is indicated at 109. The line conductors 115 and 123, wire 105 and interconnecting leads correspond to those similarly designated in Figs. 9 and 12.

In multiple with the "right" turn indicator 117 is connected the audible interrupter 200 coacting with the horn 211, yielding an intermittent sound, say of a relatively high pitch, such as is more fully described in my co-pending application, Ser. No. 436,455, filed by me on the 11th day of January, 1921 and entitled Vehicle signals, such interrupter 200 being connected at one terminal 201 by the lead 202 to the line conductor 115 and its other terminal 203 connected by the lead 204 through the lead 205 to the line wire 105, running to the battery 109.

Similarly, the interrupter 206 is connected in multiple with the "right" turn indicator 117, the interrupter 206 being of a distinguishable character from that of the interrupter 200, as by its pitch or a different frequency of intermittency. The terminal 207 of the interrupter 206 is connected by the lead 208 to the line conductor 123 and the terminal 209 of the interrupter 206 is connected by the lead 210 to the lead 205 and thence through the line wire 105 to the battery 109.

The switch 212 is preferably of the open-circuit type having the spring 213 and upon operation manually of the switch 212, the circuit through the horn 211 is closed and the proper interrupter intermittently operates the horn 211 dependent upon the setting of indicators 117, 125.

From the above it will be observed that the invention provides for manual setting of any course indicator in advance of the operation of the vehicle pursuant to the indicator thus set. That upon operation of the vehicle pursuant to the indicator set, the set indicator is automatically maintained and the manual member is electrically rendered non-operative and its hand-lever restored to neutral. Should the vehicle be operated contrary to the manual pre-setting, the indicator is modified in indication corresponding to the course actually pursued by the vehicle.

The invention further provides for automatic setting of the proper indicator by the steering gear notwithstanding the absence of any setting of the manually operated member.

It will further be noted that upon setting in either position of the manually operated member, the setting may be eliminated or "cancelled" by means of the hand lever and independently of the steering gear. Thus, in the form of the manually operated member shown in Figs. 2 and 4, upon shifting the hand lever 22 say to the left, as shown in Fig. 4 in full outline, if it is desired to cancel the "left" indication, the hand lever 22 is shifted to the right as indicated in dotted outline in Fig. 4 toward its central or neutral position of hand lever 22, whereupon the circuit through the "left" indicator 125L theretofore established as described hereinabove, is thereupon opened by the links 44R, 45R, upon the outer closed ends of their slots 48R encountering the pins 49R on the legs of the bridge member 36R and forcing the bridge member 36R to open circuit the terminals 52R, 153R, thereby opening the circuit through the electromagnets 65, 66, whereby the bridge member 36R is returned to its neutral position and also the bridge member 36R is returned to neutral position assisted by the springs 42.

In the form of the manually operated member shown in Fig. 10, under the circumstance of manual cancellation of a set indication, thus for example assuming the hand lever 22 to have been shifted to the "right", thereby setting the "right" bridge member 150R to its "right" position as shown in full outline in Fig. 10, upon now slightly shifting the hand lever 22 to the "left", the "left" bridge member 150L is separated from the terminals 160L, 161L and the circuit through the electromagnets 154R, 155R is opened, whereupon the "right" bridge member 150R is returned to its neutral position by the biasing action of the springs 164.

It will also be noted that in several forms of my invention, upon turning of the steering wheel, the hand lever of the manually operated member may be shifted either to the "left" or to the "right" without affecting the indicator set by reason of the turning of the steering wheel. Thus, in the arrangement shown in Fig. 9, as herein stated above, upon turning of the steering wheel say to the "left", the "left" turn indicator 125 is connected in the circuit comprising "ground" 112, lead 111, battery 109, conductor 105, lead 127, "left" turn indicator 125, line conductor 123, lead 135, contact plate 95, contact plate 93 and the return to "ground" 112¹. In other words, the circuit from the steering device operated member to the indicator is wholly independent of the manually operated member. Furthermore, upon say shifting the hand lever 22 of the manually operated member shown in Figs. 2 to 4, say to the "right", thereby shifting the bridge member 36R from engagement with the flexible contacts 52R and 53R, into engagement with the flexible contacts 59R, 60R, 61R and 62R, the same does not effect any closure in relation to the "right" turn indicator 117R by reason of the open circuit existing between the contact plate 96 and the contact plate 93, as will appear hereinabove in relation to the diagram of Fig. 9 and the shifting of the hand lever 22 to the "right". A similar condition of non-operativeness or ineffectuality of the manually operated member applies in the circumstance of turning of the steering wheel to the "right".

Similarly, in relation to the form of the manually operated member shown in Fig. 10, upon turning the steering wheel either to the "left" or to the "right", the shifting of the hand lever 22 does not affect the actuation of the indicator set by the steering wheel in its turned position nor cause the actuation of the other indicator or indicators. This will be apparent from the circuits shown in the diagram of Fig. 12 and from the particular circuits hereinabove traced which are complete upon turning the steering wheel to the "left" and to the "right" respectively, similarly as in the instance of the circuits shown in Fig. 9.

My invention possesses the advantage of open circuit condition during the stage of straight-ahead movement of the vehicle in the absence of manual setting.

The invention is adapted for ready installation as an attachment to completed automobiles, and accordingly in a form to be sold on the market as an accessory. The invention may also be incorporated in the original assembly of the automobile and may be appropriately installed integrally with the regularly designed parts of the automobile.

The invention of this application is an improvement of the invention in my co-pending application Ser. No. 436,455, filed Jan. 11, 1921, and entitled Vehicle signals.

Whereas I have described my invention by reference to specific parts thereof, it will be understood that many changes and modifications may be made without departing from the spirit of the invention, as defined by the appended claims.

I claim.

1. In a vehicle having a steering device, the combination with a plurality of indicating means; of means operative automatically upon movement of the steering device for operating said indicating means corresponding to the direction of movement of the steering device; said steering device automatically operated means comprising contact means controlled by said steering device, a set of contacts engaged by a contact arm supported on said steering device for the neutral position of said contact means and sets of contacts respectively for the "left" and "right" positions of said contact means, manually operable, electrically held means comprising "left" and "right" members for setting said indicating means in advance of the operation of said steering device, said manually operable, electrically held means further comprising common manually operated means for setting said "left" and "right" members respectively and further comprising electromagnetic means for holding said "left" and "right" members in set position prior to the operation of said steering device, and electrical circuit means for energizing said electromagnetic means when said contact means is in neutral position and for de-energizing said electromagnetic means when said contact means is in either its "left" or its "right" position.

2. In a vehicle having a steering device, the combination with a plurality of indicating means, of means operated automatically in the direction of movement of the steering device, said steering device automatically operated means comprising contact means, a set of contacts engaged by a contact arm supported on said steering device for its neutral position and sets of contacts for its "left" and "right" positions respectively, manually operable, electrically held means for setting said indicating means, said manually operable electrically held means comprising contact members respectively for its "left" and "right" positions, and further comprising common manually operated means for setting said "left" and "right" contact members in their respective set positions, electromagnetic means for holding said "left" or "right" contact member in its set position, and electrical circuit means connecting said set of contacts for the neutral position of said contact means with the set contact member when the steering device is in neutral position.

3. In a vehicle having a steering device, the combination with a plurality of indicating means, of means operated automatically in the direction of movement of the steering device, said steering device automatically operated means comprising contact means, a set of contacts engaged by a contact arm supported on said steering device for its neutral position and sets of contacts for its "left" and "right" positions respectively, manually operable, electrically held means for setting said indicating means, said manually operable electrically held means comprising contact members respectively for its "left" and "right" positions and further comprising common manually operated means for setting said "left" and "right" contact members in their respective set positions, electromagnetic means for holding said "left" or "right" contact member in its set position, and electrical circuit means connecting said set of contacts for the neutral position of said contact means with the set contact member when the steering device is in neutral position, and for completing an electrical circuit through said indicating means independently of said contact members upon movement of the steering device from its neutral position.

4. In a vehicle having a steering device, the combination with a plurality of indicating means, of means operative automatically upon movement of the steering device for operating said indicating means corresponding to the direction of movement of the steering device, said automatically operated means comprising contact means controlled by the steering device, a set of contacts engaged by a contact arm supported on said steering device for the neutral position of said contact means, a set of contacts for said contact means when in "left" position and a set of contacts when said contact means is in "right" position, manually operable, electrically held means comprising "left" and "right" members correspondingly setting said indicating means in advance of the operation of the steering device and further comprising common manually operated means for setting said "left" and "right" contact members in their respective set positions, and electrical circuit means connecting said set of contacts for the neutral position of said contact means with said manually operable, electrically held means when the steering device is in neutral position.

5. In a vehicle having a steering device, the combination with a plurality of indicating means, of means operative automatically upon movement of the steering device for operating said indicating means corresponding to the direction of movement of the steering device, said steering device automatically operated means comprising contact means controlled by the steering device, a set of contacts engaged by a contact arm supported on said steering device for the neutral position of said contact means and sets of contacts respectively for the "left" and "right" positions of said contact means, manually operable, electrically held means comprising "left" and "right" members for correspondingly setting said indicating means in advance of the operation of the steering device and further comprising common manually operated means for setting said "left" and "right" contact members in their respective set positions, said manually operable, electrically held means comprising electromagnetic means for holding said manually operable means in set position prior to the operation of the steering device, and electrical circuit means connecting said set of contacts for the neutral position of said contact means with the said manually operable, electrically held means when the steering device is in neutral position.

6. In a vehicle having a steering device, the combination with a plurality of indicating means, of means operative automatically upon movement of the steering device for operating said indicating means corresponding to the direction of movement of the steering device, said steering device automatically operated means comprising contact means, a set of contacts engaged by a contact arm supported on said steering device for the neutral position of said contact means and sets of contacts respectively for the "left" and "right" positions of said contact means, manually operated electrically held means for setting said indicating means, said manually operable, electrically held means comprising members respectively for its "left" and "right" positions and further comprising common manually operated means for setting said "left" and "right" contact members in their respective set positions, and electrical circuit means connecting said set of contacts for the neutral position of said contact means with the set member of said manually operable means when the steering device is in neutral position.

7. In a vehicle having a steering device, the combination with indicating means, of means operated automatically upon movement of the steering device to set said indicating means corresponding to the direction of movement of the steering device, said steering device automatically operating means including contacts of the neutral position of the steering device, and "left" and "right" members for presetting said indicating means in advance of the operation of said steering device, common manually operated means for setting said "left" and "right" members to their set positions, electromagnetic means for holding said contact members respectively in set position relative to said plurality of sets of contacts and electrical circuit means including said neutral position contacts whereby upon manual return of the pre-set "left" or "right" member to neutral position, said electromagnetic means is de-energized and said indicating means is restored to non-set position, said steering device means further comprising electrical circuit means for said indicating means independently of said "left" and "right" setting members.

8. The combination with a vehicle provided with a steering mechanism, a plurality of electrical signal circuits, and a source of power, of manually operable switching means for selectively controlling said circuits, said switching means comprising a common manually operated member and further comprising separate "left" and "right" contact members, and switch means controlled by said steering mechanism for selectively controlling said circuits and for connecting and disconnecting said source of power with respect to said manually operable switching means, said steering control switch means comprising a first contact connected with the manually operable switch means and a pair of contacts connected with the signal circuits, respectively, and a movable contact connected with a source of power and connected with said first contact in medial position of the steering mechanism and with one or the other of said pair of contacts when the steering mechanism is moved a predetermined amount in one direction or the other from medial position.

9. The combination with a vehicle provided with a steering mechanism of a plurality of electrical circuits, a source of power, separate "left" and "right" bridge members for selectively controlling said circuits, common manually operable means for setting said "left" and "right" bridge members in their respective set positions, an electro-magnet for each bridge member, contacts for each of said bridge members, a connection between said bridge members, contacts so arranged with relation to said bridge members that one bridge member contacts to complete the circuit for energizing the electro-magnet for holding the other bridge member, means for restoring said manually operable bridge members to neutral position upon release from its electro-magnet, and switch means controlled by turning said steering mechanism in the direction indicated whereby said manually operable bridge member is released and said signal is maintained until after said turn has been made and said steering wheel returned to straight ahead position.

10. The combination with a vehicle having a steering wheel mechanism, of a plurality of electrical signal circuits, a source of power, separate "left" and "right" bridge members for selectively controlling said circuits, common manually operable means for setting said "left" and "right" bridge members in their respective set positions, an electro-magnet for each bridge member, two pairs of contacts for each of said bridge members so arranged that when either of said members is operated to the "left" or to the "right" the other member bridges one of its pairs of contacts to energize the electro-magnet of the other bridge member to retain the same in position, means for restoring said manually operable bridge members to neutral position upon release from its electro-magnet, and switch means controlled by said steering mechanism for selectively controlling said circuit and for connecting and disconnecting said source of power with respect to said manually operable switching means.

In testimony whereof I have signed this specification, this 28th day of August, 1922.

EVERETT W. SWARTWOUT.